United States Patent [19]

Kashima et al.

[11] Patent Number: 5,289,351
[45] Date of Patent: Feb. 22, 1994

[54] BACKLIGHTING DEVICE

[75] Inventors: Keiji Kashima, Kanagawa; Osamu Shoji, Tokyo; Naoki Yoshida, Kanagawa, all of Japan

[73] Assignee: Tosoh Corporation, Yamaguchi, Japan

[21] Appl. No.: 854,076

[22] Filed: Mar. 19, 1992

[30] Foreign Application Priority Data

Mar. 22, 1991 [JP] Japan ................................ 3-81260
Jul. 12, 1991 [JP] Japan ................................ 3-197497

[51] Int. Cl.$^5$ ............................................. F21V 7/04
[52] U.S. Cl. ................................... 362/31; 362/26; 362/330; 362/333
[58] Field of Search ...................... 362/31, 26, 27, 339, 362/327, 330, 333

[56] References Cited

U.S. PATENT DOCUMENTS

| | | | |
|---|---|---|---|
| 4,729,068 | 3/1988 | Ohe | 362/31 |
| 4,765,701 | 8/1988 | Cheslak | 362/26 |
| 4,791,540 | 12/1988 | Dreyer, Jr. et al. | 362/31 |
| 4,796,160 | 1/1989 | Kahn | 362/339 |
| 4,822,145 | 4/1989 | Staelin | 362/31 |
| 4,922,384 | 5/1990 | Torrence | 362/31 |
| 4,937,709 | 6/1990 | Yanagi et al. | 362/31 |

FOREIGN PATENT DOCUMENTS 2165631 4/1986 United Kingdom .
8902606 3/1989 World Int. Prop. O. .

Primary Examiner—Ira S. Lazarus
Assistant Examiner—Alan B. Cariaso
Attorney, Agent, or Firm—Sughrue, Mion, Zinn, Macpeak & Seas

[57] ABSTRACT

A backlighting device for display panels operating on the edge lighting method that comprises a light conducting plate made of a light-transmissive material, a layer of light-diffusing material that partly covers one major surface of the light conducting plate, and a light diffusing/reflecting plate that covers the thus covered area of the light conducting plate. The light conducting plate is provided on its exit face with a film that is coarser grained on the exit face than on the entrance face (the side closer to the light conducting plate) and which, when provided on the exit face of the light conducting plate, will increase the luminance of light issuing from the exit face of the light conducting plate. This backlighting device produces satisfactory luminance and can be used as a high-performance model that achieves a high efficiency of power to luminance conversion at least in the direction of the line normal to the exit face.

9 Claims, 3 Drawing Sheets

BACKLIGHTING DEVICE

BACKGROUND OF THE INVENTION

1. Field of the Industrial Utility

The present invention relates to a backlighting device for liquid-crystal panels that illuminates transmissive or semi-transmissive panels from the rear side.

2. Prior Art

Thin liquid-crystal displays provided with a backlighting mechanism that allows easy viewing of information on the screen are used with recent versions of lap-top or book type word processors and computers. The backlighting mechanism in common use adopts an "edge lighting" method in which a linear light source such as a fluorescent tube is provided at one end portion of a transmissive light conducting plate as shown in FIG. 1. Further, as shown in FIG. 2, one surface of the light conducting plate operating on the edge lighting method is often covered partially with a light diffusing material having a higher refractive index than the material of which said light conducting plate is made and the thus covered area is almost entirely covered with a specular reflecting or light diffusing/reflecting plate.

In addition, as is often the case today, backlighting devices are driven with a battery and a further improvement in the efficiency of power to luminance conversion is desired. To meet this need, it has been proposed that a light reflector covering the linear light source be provided with a light reflecting plate having high light reflectance or that a reflecting plate having high reflectance be provided on the surface of the light conducting plate in the area covered with the layer of light-diffusing material.

The methods described above achieve some improvement in the efficiency of power to luminance conversion but is still insufficient and an even better improvement is desired.

SUMMARY OF THE INVENTION

An object, therefore, of the present invention is to provide a backlighting device that has a high efficiency of power to luminance conversion and which hence is capable of achieving high luminance.

The present inventors conducted various studies in order to attain this object and, as a result, they found the following: when the light conducting plate of a backlighting device operating on the edge lighting method is provided on the exit face with at least one film of a light-transmissive material that is coarser grained on the exit face than on the entrance face (the side closer to the light conducting plate), the luminous intensity distribution characteristics of the backlighting device are varied in such a way that greater directivity of light is attained in the direction of the line normal to the exit face, whereby the efficiency of power to luminance conversion is increased in the direction of a line substantially normal to the exit face.

The present invention provides a backlighting device for display panels that comprises:

a light conducting plate made of a light-transmissive material, said light conducting plate having a light-diffusing element;

a specular reflecting or light diffusing/reflecting lo plate that covers the thus covered area of the light conducting plate; and a linear light source provided in proximity to the end portion of at least one side of said light conducting plate;

characterized in that said light conducting plate is provided on its exit face with at least one film of a light-transmissive material that is coarser grained on the exit face than on the entrance face (the side closer to said light conducting plate).

DETAILED DESCRIPTION OF THE PREFERRED EMBODIMENTS

Figure 1:
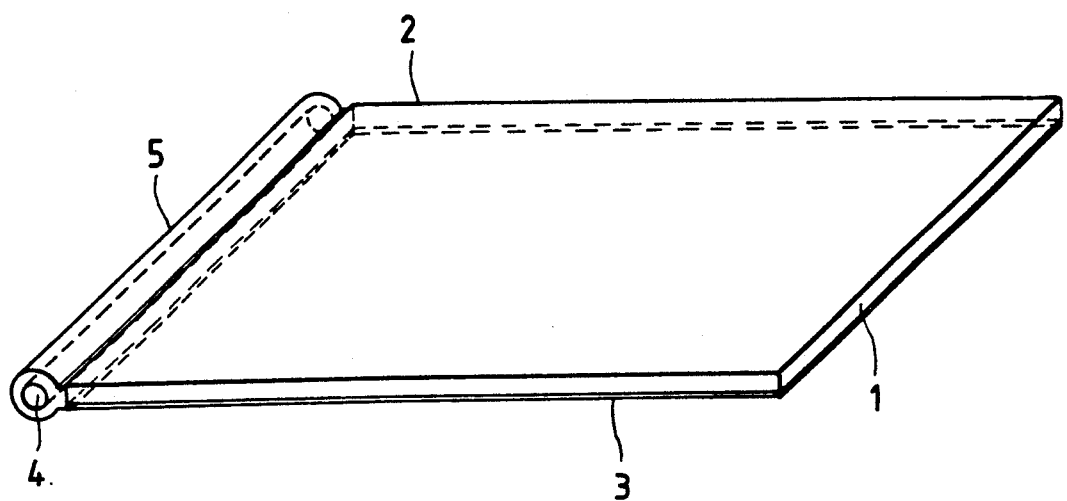
FIG. 1 is a perspective view of a backlighting device according to an embodiment of the present invention which operates on the edge lighting method.
Figure 2:
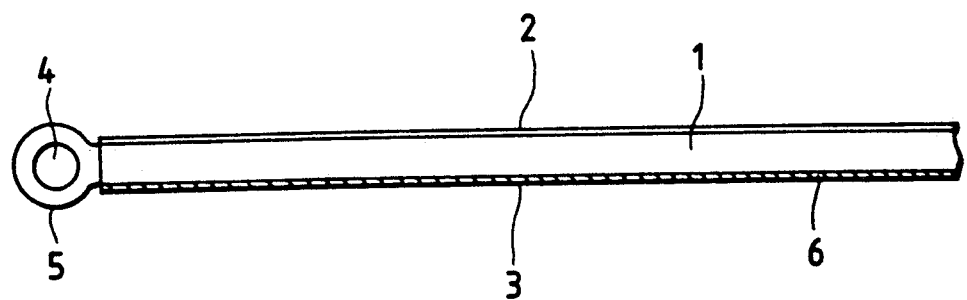
FIG. 2 is a longitudinal section of the same backlighting device.

The present invention is described below in detail with reference to the accompanying drawings. FIG. 1 is a perspective view of a backlighting device according to an embodiment of the present invention and FIG. 2 is a longitudinal section of a backlighting device operating on the edge lighting method. Shown by 1 in FIGS. 1 and 2 is a light conducting plate 1 that may be made of any material that is capable of efficient light transmission, as exemplified by quartz, glass, light-transmissive natural or synthetic resins such as acrylic resins. Shown by 2 is a film of a light-transmissive material that is coarser grained on the exit face than on the entrance face (the side closer to the light conducting plate). This film changes the luminous intensity distribution characteristics of light issuing from the light conducting plate in such a way that the directivity of light in the direction of the line normal to the exit face is enhanced. In the present invention, at least one sheet of the film of the type described above need be used but, as will be apparent from Example 3 to be described hereinafter, a further improvement in luminance can be achieved by using more than one sheet, say, two sheets of the film.

The most characterizing part of the present invention is that the above-described film which is made of a light-transmissive material and which is coarser grained on the exit face than on the entrance face (the side closer to the light conducting plate) is provided on the exit face of the light conducting plate.

This condition is described below more specifically. The film indicated by 2 in FIGS. 1 and 2 is made of a light-transmissive material and is coarser grained on the exit face than on the entrance face (the side closer to the light conducting plate). The film may be made of any light-transmissive material such as acrylic resins, polycarbonates or glass and there is no particular limitation on the materials that can be used. The roughening method for use in making the exit face of the film coarse grained is not limited in any particular way and various methods may be employed, including embossing, sand blasting, die molding with a hot press and a chemical treatment. There is no particular need to roughen the entrance face of the film (on the side closer to the light conducting plate) and the only requirement that has to be satisfied is that the exit face of the film should eventually be coarser grained than the entrance face. Whether the exit face of the film is "coarser grained" can be checked by measuring "ten-point average roughness", "center-line-average roughness" and other parameters in accordance with the methods specified in JIS B 0601.

Figure 5:
FIG. 5 is a diagram showing a coarser-grained surface of the exit face of the film provided on the light-conducting plate of the invention.

The grained state of the exit face of the film described above (and shown, for example, in FIG. 5) which is made of a light-transmissive material is not limited in any particular way and the grained exit face may have a regular pattern or an irregular pattern. To give a general guideline, the grained exit face of the film is preferably shown to have surface asperities as examined under a microscope at a magnification of 100, with the difference in height between a concave and an adjacent convex as taken in the direction of the line normal to the exit face or the distance between adjacent concaves or convexes as taken in the direction parallel to the exit face being in the range of 10 to 1,000 $\mu$m.

Figure 6:
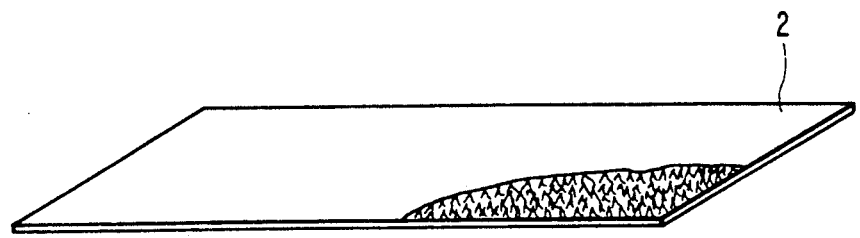
FIG. 6 is a diagram showing a coarser-grained surface of the exit face of the film provided on the light-conducting plate of the invention, which is composed of convex shapes.

In another expression, the grained state of the exit face of the film under consideration may be such that said exit face in a section of the film taken at any point is composed of convex shapes (i.e., as shown in FIG. 6) such as prisms or cones similar to convex lenses, with the vertical angle being in the range of 40 to 170 degrees, preferably 80 to 150 degrees, further preferably 85 to 120 degrees, further more preferably 90 to 110 degrees. (The vertical angle is directed to a vertical angle when the film is cut so as to obtain a minimum vertical angle.)

Liquid-crystal displays provide a lower contrast as the angle at which the viewer looks at the display face increases as measured from the line normal to that display face. Hence, one of the performance indices that bear particular importance in practical applications of liquid-crystal displays is the luminance as measured in the neighborhood of the direction of the line normal to their display face. As already mentioned hereinabove, the film which is coarser grained on the exit face than on the entrance face is provided on the exit face of the light conducting plate and, by so doing, the luminance of light issuing from the light conducting plate is amplified and the directivity of the output light is further enhanced. This may be stated more specifically as follows: the luminance of light issuing from the exit face as measured in the direction of a line substantially normal to said exit face is amplified compared to the case where the film of the type described above is not provided or where a film that is not coarsely grained on the exit face than on the entrance face, and the luminance as measured at an angle, say, 60 degrees, with respect to the line normal to the exit face decreases by a greater degree than does the luminance as measured in a direction that is substantially normal to the exit face (e.g., the decrease is ca. 50 to 60%, sometime 20%, of the value as measured in the normal direction). These and other evidential facts show the more effectively enhanced directivity of the light issuing from the exit face.

It should be noted here that luminance measurements may be performed with a customary commercial luminance meter.

As will be described hereinafter, a light diffusing material (indicated by 6 in FIG. 2) is printed in a dotted pattern on the surface of the light conducting plate; if necessary, a light diffusing plate may be provided between the film described above and the light conducting plate in order to make the dotted pattern indiscernible to the human eye.

The light conducting plate of the present invention has a light-diffusing element on a surface thereof. The light-diffusing element is provided in such a manner that, for example, a light-diffusing material partly covers a surface thereof, or a concave/convex is formed on the surface thereof.

The light-diffusing material which is to be applied to one major surface of the light conducting plate may be a paint or printing ink that contains a suitable pigment, such as titanium white, that has a higher refractive index and diffusion reflectance than the material of which the light conducting plate is made. Such light-diffusing materials are screen-printed or otherwise printed in dots on one major surface of the light conducting plate.

The specular reflecting or light diffusing/reflecting plate (as indicated by 3 in FIGS. 1 and 2) is provided in such a way as to cover substantially the entire surface of the light conducting plate, opposite the surface covered by the film that is already covered with the light-diffusing material. Shown by 4 is a linear light source which, in a preferred embodiment, is covered with a light reflector 5 in such a way as to provide a certain clearance from the outer surface of said linear light source. The reflector 5 has a slit formed in the surface through which incident light from the linear light source is admitted into an end portion of the light conducting plate. The linear light source is provided in proximity to at least one end face portion of the light conducting plate in such a way that its central axis is substantially parallel to either end face of the light conducting plate.

The linear light source 4 may be selected from among various types including a fluorescent tube, a tungsten incandescent tube, an optical rod and an array of LEDs, and a fluorescent tube is preferred. From the viewpoint of power saving, it is preferred that the length of the uniform light emitting portion except the electrode portion is substantially equal to the length of the end portion of the light conducting plate in proximity to that emitting portion.

The backlighting device of the present invention which has its principal part composed in the manner described above is to be used with display panels, particularly with liquid-crystal display panels. In a particularly preferred case, the backlighting device of the present invention has the following constitutional features.

1) The light diffusing material is formed in a dot pattern on the surface of the light conducting plate. Dots may be of any shape such as a circle or rectangle. They may also be formed of crosslines. Such dots are formed in a grid pattern, with each dot being located at the point where any two imaginary lines are crossed at right angles. Adjacent crossed lines are preferably spaced apart by 0.5 to 3 mm, more preferably 0.8 to 2 mm, with an appropriate distance being selected in accordance with the thickness of the light conducting plate.

The surface of the light conducting plate is covered with the light diffusing material in such a way that the percent coverage is preferably 1 to 50% of the plate surface in areas near the linear light source and 20 to 100% in the area that is the farthest from the light source. Preferably, the light conducting plate is covered with the light diffusing material in such a way that the percent coverage increases gradually with the distance from the light source starting at the point where the linear light source is placed in proximity to the end portion of one side of said light conducting plate. In the neighborhood of the end portion of the other side of the light conducting plate (remote from the linear light source), the percent coverage with the light diffusing material may be comparable to or smaller than the value for the preceding or most adjacent area. The term "percent coverage" as used herein means the proportion of a unit area of the light conducting plate that is occupied by the coating of the light diffusing material.

2) More preferably, the percent coverage (Y%) with the light diffusing material increases in proportion to a power of the distance (X in mm) from the linear light source to the light diffusing material in a grid pattern, with the power ranging from 1.7 to 3.5. In other words, the percent coverage (Y) should increase at those values which lie between the lines represented by $Y=aX^{1.7}$ and $Y=aX^{3.5}$ (where a denotes the value that is determined from the percent coverage for the end portion of the surface of the light conducting plate and satisfies the relation $0<a\leq 2$), or Y should increase to satisfy the relation $Y=a^x$ (where a is the value determined by the same method as just described above and satisfies the relation $1<a\leq 2$), with Y and X being taken on the vertical and horizontal axes, respectively.

3) It is also preferred for the present invention that the percent coverage with the light diffusing material which is coated on the light emitting surface along grid forming lines that are parallel to the axis of the linear light source increases gradually with the distance by which the coating departs from a line on the surface of the light conducting plate that is dropped perpendicular to the linear light source from the center of each parallel line (i.e., the center of the length of the linear light source) towards both ends thereof.

The backlighting device of the present invention is used in practice with an optical display panel such as a liquid-crystal panel being positioned on top of the exit face.

The backlighting device of the present invention is comparatively small in size and yet produces satisfactory luminance; therefore, it can be used as a model having high efficiency of power to luminance conversion in the direction of the line normal to the exit face.

EXAMPLES 1 TO 3 AND COMPARATIVE EXAMPLES 1 TO 4

Comparative examples and working examples of the present invention are described below in order to further illustrate the invention.

A rectangular light conducting plate (225 mm×127 mm) having a thickness of 2.0 mm (see FIG. 1) was provided. A cold-cathode fluorescent tube (a normal tube of Harrison Denki K.K.) with a diameter of 4.8 mm was positioned in contact with one of its shorter sides. The fluorescent tube was enclosed with a cylindrical aluminum reflector having a slit 2 mm wide in contact with the light conducting plate in such a way that light emerging through the slit would be admitted into the plate from one shorter side.

A light-diffusing material (paint containing titanium white) was applied over the surface of the light conducting plate by screen-printing a pattern of circular dots in such a way that the coverage with the light-diffusing material would be 6% at minimum and 80% at maximum, with the coverage being proportional to $a^x$ in the intermediate area.

A sheet of polycarbonate film having a thickness of ca. 200 µm that was coarser grained on the exit face than on the entrance face (the side closer to the light conducting plate) by embossing was provided on the exit face of the light conducting plate. The surface asperities on the exit face of the film were examined under a microscope at a magnification of 100 and the results were as follows: the difference in height between a concave and an adjacent convex as measured in the direction of the line normal to the exit face of the film was 10 to 100 µm; and the distance between adjacent concaves or convexes as measured in the direction parallel to the exit face of the film was 10 to 800 µm. In addition, the vertical angle was in the range of 80 to 150 degrees when the film is cut so as to obtain a minimum vertical angle.

The roughness of the coarse grained surface of the film was measured in accordance with JIS B 0601 under the following conditions: longitudinal recording magnification=500; transverse recording magnification=50; drive speed=0.3 mm/sec; probe=stylus equipped with a diamond tip of 5 µm in radius. The results were as follows: maximum height of roughness (Rmax)=85 µm; ten-point average roughness (Rz)=60 µm; and center-line-average roughness (Ra)=13 µm. Similar measurements of the roughness of the none coarse grained surface of the film were conducted but under different conditions as follows: longitudinal recording magnification=2,000; transverse recording magnification=50; drive speed=0.3 mm/sec; and probe=stylus equipped with a diamond tip of 5 µm in radius. The results were as follows: Rmax=12 µm; Rz=7 µm; and Ra=1 µm.

Figure 3:
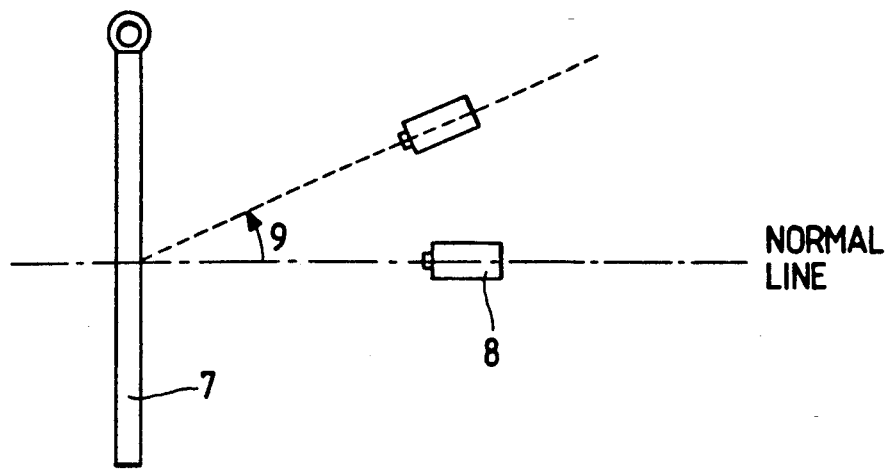
FIG. 3 shows schematically the concept of the method used in the present invention for luminance measurements.

The areal luminance as produced when the cold-cathode tube was driven at a constant current (a constant power) with an alternating voltage (30 kHz) being applied from an invertor was measured with a luminance meter (Topcon BM-7) in the direction of the line normal to the exit face at a field coverage angle of 2 degrees and with the distance from the exit face to the luminance meter (as indicated by 8 in FIG. 3) being held at 40 cm. The result was 222 cd/m² (Example 1).

A backlighting device was constructed in the same way and operated under the same conditions as in Example 1 except that an ordinary unembossed light-diffusing film (D-204 of Tsujimoto Denki Seisakusho K.K.) was provided between the grained (i.e., embossed) film and the light conducting plate. A luminance measurement was conducted as in Example 1 and the result was 221 cd/mm² (Example 2).

The surface roughness of the light-diffusing film (D-204) used in Example 2 was measured under the following conditions: longitudinal recording magnification=2,000; transverse recording magnification=50; drive speed=0.3 mm/sec; probe=stylus equipped with a diamond tip of 5 µm in radius. The results were as follows: Rmax=13 µm; Rz=9 µm; Ra=1 µm.

A backlighting device was constructed in the same way and operated under the same conditions as in Example 1 except that two sheets of the same film as used in Example 1 which was coarser grained on the exit face than on the entrance face (the side closer to the light conducting plate) was provided in superposition on the exit face of the light conducting plate. A luminance measurement was conducted as in Example 1 and the result was 239 cd/m² (Example 3).

A backlighting device was constructed in the same way and operated under the same conditions as in Example 1 except that a single sheet of unembossed light-diffusing film (D-204 of Tsujimoto Denki Seisakusho K.K.) was provided on the exit face of the light conducting plate in place of the film coarse grained by embossing. A luminance measurement was conducted as in Example 1 and the result was 192 cd/m² (Comparative Example 1).

A backlighting device was conducted in the same way and operated under the same conditions as in Example 1 except that the film coarse grained by embossing was provided in such a way that the coarse grained side would face the exit face side of the light conducting plate. A luminance measurement was conducted as in Example 1 and the result was 185 cd/m² (Comparative Example 2).

A backlighting device was constructed in the same way and operated under the same conditions as in Comparative Example 2 except that the light-diffusing plate (D-204 of Tsujimoto Denki Seisakusho K.K.) used in Example 2 was provided between the coarse grained film and the light conducting plate. A luminance measurement was conducted as in Example 1 and the result was 183 cd/m² (Comparative Example 3).

A backlighting device was constructed in the same way and operated under the same conditions as in Example 1 except that only two sheets of the light-diffusing film (D-204 of Tsujimoto Denki Seisakusho K.K.) used in Example 2 were provided in superposition on the exit face of the light conducting plate. A luminance measurement was conducted as in Example 1 and the result was 188 cd/m² (Comparative Example 4).

Figure 4:
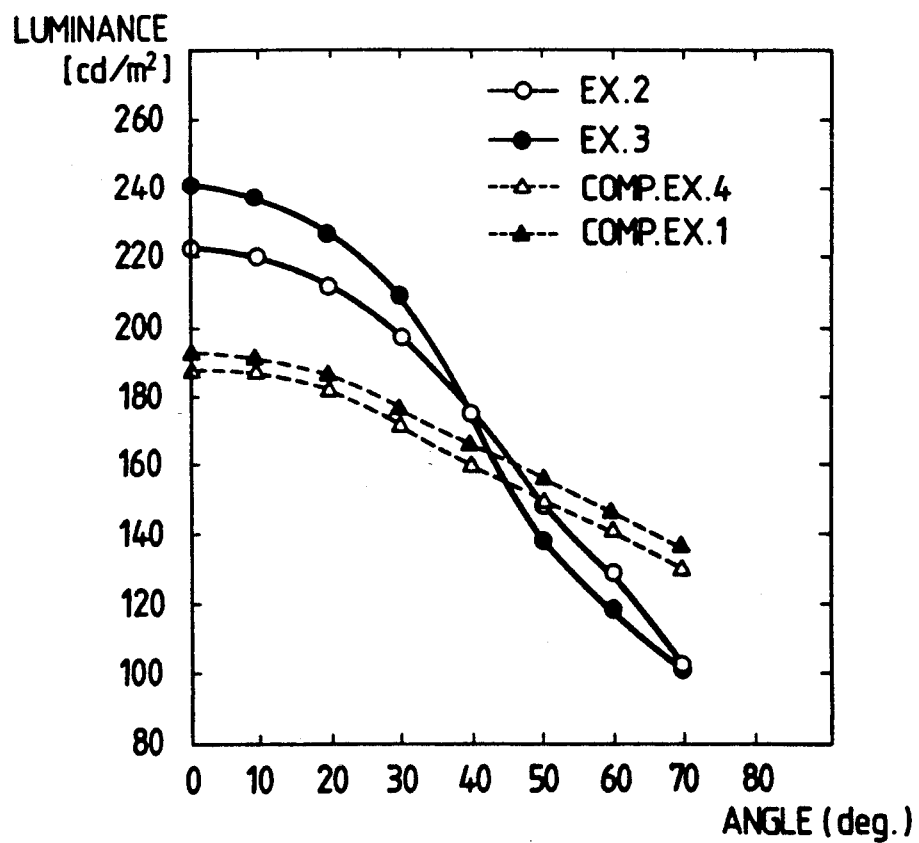
FIG. 4 is a diagram showing the luminance of output light vs angle profiles of the backlighting devices constructed in Examples 2 and 3, as well as in Comparative Examples 1 and 4.

The luminous intensity distribution characteristics of the backlighting devices constructed in Examples 2 and 3 and in Comparative Examples 1 and 4 were investigated by the following procedure: with each device being driven with a constant current flowing under an alternating voltage applied at 30 kHz from an invertor to the cold-cathode tube, the areal luminance was measured with a luminance meter (Topcon BM-7) at a field coverage angle of 2 degrees and with the angle with respect to the line normal to the exit face (as indicated by 9 in FIG. 3) being varied from 0 to 70 degrees, while the distance from the exit face to the luminance meter being held at 40 cm. The results are shown in FIG. 4, from which one can see that using the backlighting device of the present invention contributes a higher luminance and a marked improvement in the directivity of output light.

What is claimed is:

1. A backlighting device for display panels, comprising:
    a light-conducting plate comprising a light-transmissive material, said light-conducting plate having a light-diffusing material disposed thereon;
    one of a specular reflecting plate and a light diffusing-/reflecting plate that covers an entire bottom surface of the light-conducting plate; and
    a linear light source provided in proximity to an end portion of at least one side of said light-conducting plate for propagating light along the entire light-conducting plate;
    wherein said light-conducting plate includes an exit face opposite said bottom surface and having positioned thereon at least one film of a light-transmissive material, said film having an entrance face and an exit face, said exit face of said film being coarser grained than on said entrance face of said film, said entrance face of said film being closer to said light-conducting plate than said exit face of said film.

2. A backlighting device according to claim 1, wherein said film of a light-transmissive material provided on the exit face of the light conducting plate increases the luminance of light issuing from the exit face of said light-conducting plate as measured in the direction of a line substantially normal to the exit face of said film.

3. A backlighting device according to claim 1, wherein the grained exit face of the film includes surface asperities and, when examined under a microscope at a magnification of 100, said face has a contour such that the difference in height between a concave and an adjacent convex as taken in the direction of the line normal to the exit face or the distance between adjacent concaves or convexes as taken in the direction parallel to the exit face, is in the range of 10 to 1,000 μm.

4. A backlighting device according to claim 2, wherein the grained exit face of the film includes surface asperities and, when examined under a microscope at a magnification of 100, said face has a contour such that the difference in height between a concave and an adjacent convex as taken in the direction of the line normal to the exit face or the distance between adjacent concaves or convexes as taken in the direction parallel to the exit face, is in the range of 10 to 1,000 μm.

5. A backlighting device according to claim 1 wherein said light-diffusing material partly covers one major surface of said light-conducting plate, said light-diffusing material having a higher reflective index than the material of which said light-conducting plate is made.

6. A backlighting device according to claim 1, wherein the coarser grained exit face of said film comprises a surface having projections thereon having an apex, an apical angle being formed with respect to said coarser grained exit face of said film when said film is cut through the apex of the projections in a direction perpendicular to the surface of the coarser grained exit face, said angle being in the range of 80 to 150 degrees when said film is cut so as to obtain a minimum apical angle.

7. A backlighting device according to claim 3, wherein the coarser grained exit face of said film comprises a surface having projections thereon having an apex, an apical angle being formed with respect to said coarser grained exit face of said film when said film is cut through the projections in a direction perpendicular to the surface of the coarser grained exit face, said angle being in the range of 80 to 150 degrees when said film is cut so as to obtain a minimum apical angle.

8. A backlighting device according to claim 1, wherein said film is directly positioned on said light-conducting plate.

9. A backlighting device according to claim 1, wherein a light diffusing film is provided between said light-conducting plate and said film having the coarser grained exit face.

* * * * *